J. LEFFLER.
Nut-Lock.

No. 215,375. Patented May 13, 1879.

WITNESSES:
Achilles Sehehl.
C. Sedgwick

INVENTOR:
J. Leffler
BY Munn & Co
ATTORNEYS.

UNITED STATES PATENT OFFICE.

JONATHAN LEFFLER, OF MYERSTOWN, PENNSYLVANIA.

IMPROVEMENT IN NUT-LOCKS.

Specification forming part of Letters Patent No. 215,375, dated May 13, 1879; application filed January 27, 1879.

*To all whom it may concern:*

Be it known that I, JONATHAN LEFFLER, of Myerstown, in the county of Lebanon and State of Pennsylvania, have invented a new and Improved Self-Tightening Lock-Nut, of which the following is a specification.

The object of my invention is to furnish a nut for securing the bolts of railroad-rails or parts of machinery, which will, when applied, be locked or prevented from turning backward, and will also be self-tightening upon its seat, to take up shrinkage and prevent rattling.

My invention relates to a two-part nut connected together by an interposed spring, held from turning backward by a pawl. When in use, one part of the nut is held by friction against the object clamped, and the other part held with the spring under tension by the pawl, so that the spring causes the clamping-section to take up shrinkage or looseness.

In the accompanying drawings, my invention is shown in the form which I prefer.

Figure 1:
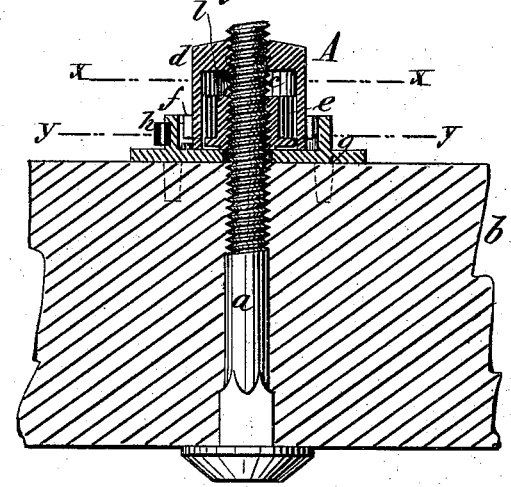
Figure 2:
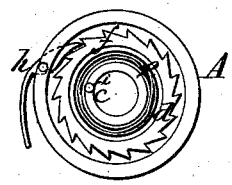
Figure 3:
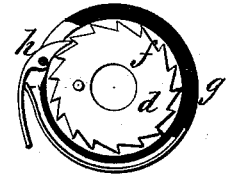

Figure 1 is a section lengthwise of the bolt to which the nut is attached. Fig. 2 is a cross-section on line $x\,x$ of Fig. 1. Fig. 3 is a similar view on line $y\,y$ of Fig. 1.

Similar letters of reference indicate corresponding parts.

A is my improved nut, shown applied on a bolt, $a$, to a block, $b$. The bolt is squared next its head to fit in the corresponding aperture of blocks $b$ without turning. The nut A is in two parts—an inner portion, $c$, that consists of an interior threaded flanged sleeve, having an annular projection or flange formed on its bottom part to permit it to come in contact with the washer before the cap $d$, and thereby permit the said cap to be turned to wind up the spring before it comes in contact with the said washer, and forming the clamping portion of the nut, and an outer cap, $d$, that sits over and around part $c$, and has a threaded central hole, which permits the cap $d$ to be screwed upon bolt $a$.

In the annular space between the parts $c\,d$ is a flat coiled spring, $e$, connected rigidly to the inner side of $d$ and hooked upon the nut $c$, so that the parts will not become detached.

Upon the cap $d$, around the outside, is a ratchet, $f$, and pivoted upon an annular washer, $g$, that lies upon block $b$ beneath nut $a$, is a spring-pawl, $h$, that engages with the ratchet $f$, so as to prevent cap $d$ from turning backward, except when the pawl is raised by pressure upon its projecting tail.

The washer $g$ is provided with pins or lugs, that enter block $b$ and prevent the washer from turning.

The nut $c$ and cap $d$ being secured together by the spring, as hereinbefore described, they will, when screwed upon the bolt $a$ by hand or application of a wrench to the cap $d$, turn together until the annular projection or flange on the bottom of the nut $c$ comes in contact with the washer $g$, when the nut $c$ will cease to turn, and by the continued turning of the cap $d$ until it comes in contact with the said washer the spring will be wound up, and, the ratchet of the cap being engaged by the pawl of the washer, the cap $d$ will be held to its seat with the spring under tension.

In case of shrinkage of block $b$, the washer $g$ and nut $c$ will follow up, as the spring $e$ constantly tends to turn nut $c$ forward.

To remove the nut from the bolt, cap $d$ will be turned slightly forward, the pawl $h$ disengaged, and spring $f$ permitted to recoil and turn cap $d$ back as far as it will. The parts $c\,d$ may then be unscrewed together from the bolt.

Upon nut $c$ is a pin, $i$, that is engaged by a pin, $l$, on cap $d$, when the latter is turned backward to turn nut $c$ in the same direction.

If desired, in place of pin $l$, there may be a groove in cap $d$, in which groove pin $i$ will enter.

It is evident that the device described may be applied to the bolts of fish-plates, and for clamping any desired connection where a clamping-nut is useful and it is desirable to prevent looseness.

Having thus described my invention, I claim as new and desire to secure by Letters Patent—

The combination of the nut $c$, cap $d$, provided with ratchet-teeth $f$, spring $e$, washer $g$, and pawl $h$, constructed and arranged for operation substantially as and for the purposes set forth.

JONATHAN LEFFLER.

Witnesses:
DANIEL B. HARPER,
ELMER E. LEFFLER.